United States Patent
Freking

(10) Patent No.: US 8,730,765 B2
(45) Date of Patent: May 20, 2014

(54) METHOD AND DEVICE FOR MEASURING A PROFILE OF THE GROUND

(75) Inventor: Benno Freking, Weyhe-Leeste (DE)

(73) Assignee: Atlas Elektronik GmbH, Bremen (DE)

(*) Notice: Subject to any disclaimer, the term of this patent is extended or adjusted under 35 U.S.C. 154(b) by 178 days.

(21) Appl. No.: 13/498,083

(22) PCT Filed: Aug. 24, 2010

(86) PCT No.: PCT/EP2010/062346
§ 371 (c)(1),
(2), (4) Date: Jul. 3, 2012

(87) PCT Pub. No.: WO2011/036012
PCT Pub. Date: Mar. 31, 2011

(65) Prior Publication Data
US 2012/0269036 A1    Oct. 25, 2012

(30) Foreign Application Priority Data

Sep. 24, 2009  (DE) .......................... 10 2009 042 970

(51) Int. Cl.
*G01S 15/89* (2006.01)
(52) U.S. Cl.
USPC ............................................................ 367/88
(58) Field of Classification Search
CPC ........ G01S 7/52003; G01S 7/54; G01S 15/88
USPC ............................................................ 367/88
See application file for complete search history.

(56) References Cited

U.S. PATENT DOCUMENTS

| 5,200,931 A | 4/1993 | Kosalos et al. |
| 2010/0265489 A1 | 10/2010 | Seeger |
| 2012/0230152 A1* | 9/2012 | Freking et al. ................. 367/88 |
| 2012/0269036 A1* | 10/2012 | Freking ........................... 367/88 |

FOREIGN PATENT DOCUMENTS

| EP | 1793243 A1 | 6/2007 |
| GB | 2197952 A | 6/1988 |
| WO | WO2011/036012 | * 3/2011 |

OTHER PUBLICATIONS

Philip N. Denbigh; "Signal Processing Strategies for a Bathymetric Sidescan Sonar" IEEE Journal of Oceanic Engineering, Jul. 1994, vol. 19; No. 3; pp. 382-390.
International Search Report issued in PCT/EP2010/062346.

* cited by examiner

*Primary Examiner* — Daniel Pihulic
(74) *Attorney, Agent, or Firm* — Fitch, Even, Tabin & Flannery LLP

(57) ABSTRACT

A method for measuring a profile of the ground involves using a transmitting arrangement, which is attached to a watercraft, for the directed emission of sound signals into an underwater area and a receiving arrangement having at least two transducers for receiving sound waves reflected by the profile of the ground.

6 Claims, 6 Drawing Sheets

METHOD AND DEVICE FOR MEASURING A PROFILE OF THE GROUND

CROSS-REFERENCE TO RELATED APPLICATIONS

Figure 1:
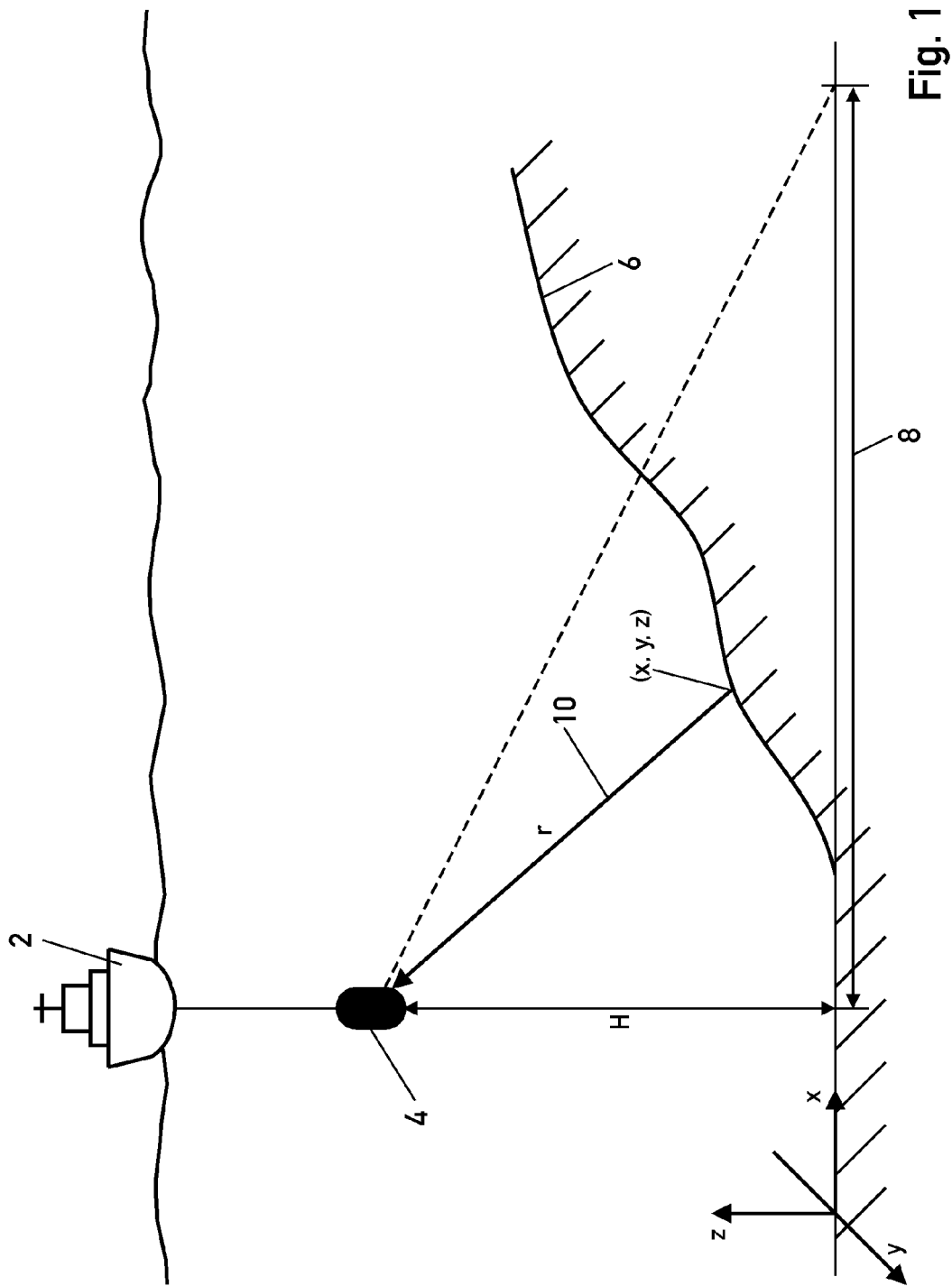

This Application is a U.S. National Phase Application filed under 35 U.S.C. §371 of International Application No. PCT/EP2010/062346, filed Aug. 24, 2010, designating the United States, and claims priority from German Patent Application No. 10 2009 042 970.0 filed Sep. 24, 2009, the complete disclosures of which are hereby incorporated herein by reference in their entirety for all purposes.

The invention relates to a method for measuring a profile of the ground by means of an acoustic transmitting and receiving arrangement attached to a watercraft of the type cited in the preamble of Claim 1 and to a device for embodying the method according to Claim 6.

The invention is primarily used for measuring a profile of the ground inside a predefined underwater area. To measure a profile of the ground inside a predefined underwater area, so-called fan echo sounder systems are conventionally used. They usually scan an angular range of up to 150 degrees in size transverse to the direction of travel and measure this area essentially simultaneously. To do so, sound pulses are emitted, which after reflection at an object or the floor of the stretch of water are received in a direction-selective manner as echoes by means of the receiving arrangement. By means of electronic signal processing of individual received signals from the transducers of the receiving arrangement, carried out as part of a so-called beamsteering, the receiving arrangement in the predefined underwater area has a fan consisting of a plurality of directivity characteristics which are angularly offset with respect to one another.

In order to identify precise details of the structure of the ground or of sunken objects when measuring the profile of the ground, a high angular resolution is required. Conventionally a high angular resolution is obtained by concentrating the directivity characteristic while transmitting and/or receiving. A standard measure involves enlarging the transmitting and/or receiving arrangement, in order to reduce the beam width of its directivity characteristic. This method however requires large transducer sets and is therefore highly cost-intensive.

In addition to the above-mentioned method which uses large transducer sets as a receiving arrangement, the resolution of which is limited by its construction, so-called high-resolution methods for angle determination are known. These methods include the MUSIC (Multiple Signal Classification) method. The accuracy of the results with these methods however is also dependent on the number of transducers in the receiving arrangement. The more transducers the receiving arrangement has, and the longer the signal block to be processed, the more accurate are the results. The disadvantage of these methods is also their computational cost, which makes their use in real-time systems more difficult.

Alternatively, Sonar systems with interferometry technology for increasing the resolution when measuring the profile of the ground are known. They use an interferometric signal-processing technique with e.g. a differential phase measurement. In the article "Signal Processing Strategies for a Bathymetric Sidescan Sonar" by Philip N. Denbigh in the IEEE Journal of Oceanic Engineering, 19(3): 382-390, July 1994, principles of direct phase difference measurement in interferometric systems are described in more detail. For this technique a second receiving antenna, operating independent of the first, is required. This delivers an additional received signal, which due to the different distances from the object, delivers a signal which is time-delayed relative to the first antenna. A measured phase shift between the received signals from the different antennas is ambiguous, however. Only if the distance between the antennas is less than $\lambda/2$ is the measured phase difference unique. Conventionally with direct phase difference measurement a Sonar system with 3 to 4 receiving antennas is used. With these arrangement, three phase differences are available, which are used to correct the measured phases. The disadvantage of this method is the equally high cost of the antennas.

GB 2 197 952 discloses an echo-sounding system for measuring a floor of a stretch of water in which a region of the floor of the stretch of water is irradiated with an acoustic signal, the energy of which is received by means of two transducers. A relative phase of the two transducer output signals shows a direction of the point on the ground from which the echo is received. However, ambiguities arise in such a directional determination process according to the distance to the transducer. By the use of transmission signals with two or more frequencies this ambiguity is resolved, since when e.g. two different frequencies are used, two different characteristic lobed patterns are produced. Ideally, only the main lobes of the respective patterns correspond, in which case the previously mentioned ambiguities in the angle determination can be resolved.

EP 1 793 243 A1 discloses a further method for resolving phase ambiguities. In this method, to determine distance information by means of a phase-measuring principle, a signal with at least two different wavelengths is emitted and its reflection received, and the associated phases are determined. To resolve phase ambiguities an ambiguity interval is discretised in cells of defined width. A counter and a distance are assigned to each cell. For the cells which are assigned to a possible target distance, the counter state is incremented. From the distribution of the counter states an absolute phase or a true target distance to at least one target object is determined.

The problem addressed by the invention finally is to create an inexpensive method for measuring a profile of the ground.

The invention solves this problem by the features of a method for measuring a profile of the ground according to Claim 1 and by a corresponding device having the features of Claim 6. In these, a sound signal with a plurality N of predefined frequencies that are different from one another is successively emitted into the underwater area by means of a transmitting arrangement and components of said sound signal reflected by the profile of the ground are received by means of the receiving arrangement, wherein the receiving arrangement has at least two transducers, which each generate an electrical received signal from the received sound waves. The N different frequencies of the transmitted signal can be filtered out from the received signals. The measurement of the profile of the ground is made by means of these filtered received signals, making use of a pure phase analysis and a subsequent density analysis.

Depending on the distance between the transducers of the receiving arrangement and on the frequency or the wavelength of the emitted sound signals, a pure phase analysis may possibly deliver multiply ambiguous results. The method according to the invention however does not at first take account of this multiple ambiguity in the angle determination.

The multiple measurement with different frequencies of the emitted sound signal resulting from the ambiguous results is utilised to produce an unambiguous determination of the profile of the ground using a density analysis. In this method, for a plurality of predefined sampling times and for each frequency of the emitted sound signal, a phase difference between two received signals delivers multiple ambiguous path differences depending on the distance from the transducers to the receiving arrangement, as well as receiving angles associated with these path differences. By means of the transit times and the receiving angles, incidence coordinates (x, y, z) are determined for these sampling times and for the frequencies. Subsequently for the incidence coordinates (x, y, z), a data density is determined within a predefined surface element containing the incidence coordinate (x, y, z), wherein the data density represents a measure of the number of previously determined incidence coordinates within this surface element.

At the point at which the true incidence coordinate (x, y, z) is located, the density of the measurements increases. The positions of the additional incidence coordinates that are produced as a result of the phase analysis, have a lower data density. The method according to the invention therefore delivers a method for ascertaining which is the true incidence coordinate (x, y, z) of the sound signal. From this, a profile of the ground can be determined.

The method according to the invention has the advantage that, despite a previously mentioned multiple ambiguity in the angle determination when using a receiving arrangement with only two transducers, unambiguous measurement results can be obtained by performing the measurement of the profile of the ground with different frequencies and then carrying out a density analysis.

In a further embodiment of the invention the data density information is not collected by means of the incidence coordinates (x, y, z), but via the angles of incidence calculated from the path difference.

In a further embodiment of the invention, the device according to the invention has the advantage that by using a receiving arrangement with two individual transducers, it can be produced with very small dimensions. It can, for example, also be carried by small, autonomously acting or remote-controlled underwater vehicles. The method according to the invention, in order to receive the sound waves reflected by the profile of the ground uses a receiving arrangement which has at least two individual electroacoustic and/or optoacoustic transducers that can be arranged at any desired distance apart.

In a further embodiment of the invention, a transducer array is used as a receiving device. A beamformer connected downstream of the receiving arrangement, which in the underwater area generates a fan of a plurality of directivity characteristics that are angularly offset with respect to one another, has the advantage that it increases the resolution of the Sonar system according to the width of the directivity characteristic.

Figure 3:
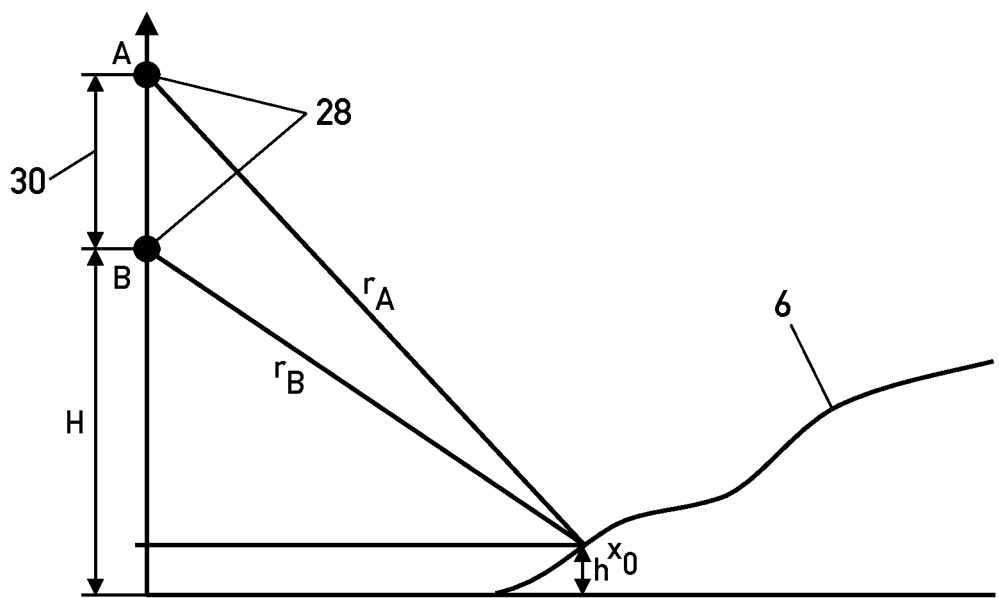
Figure 4:
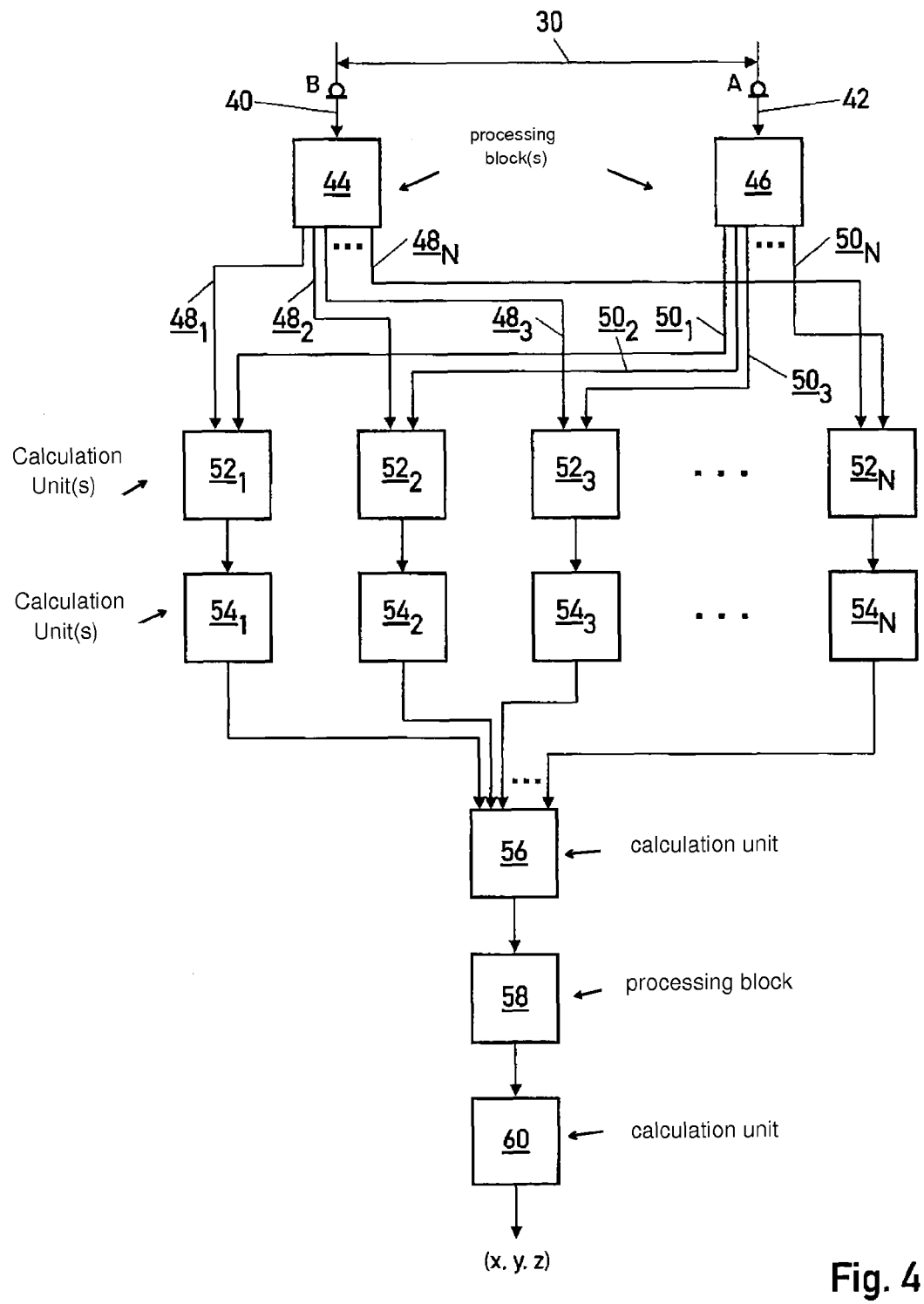
Figure 5:
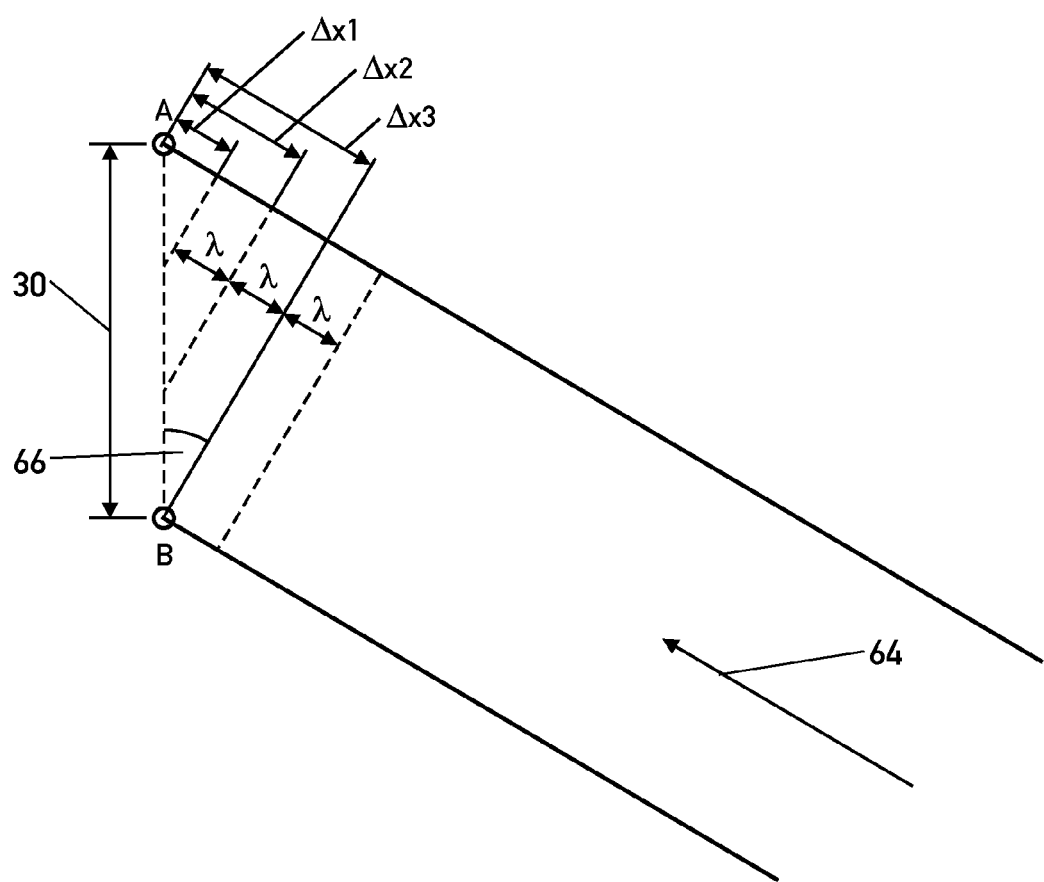
Figure 6:
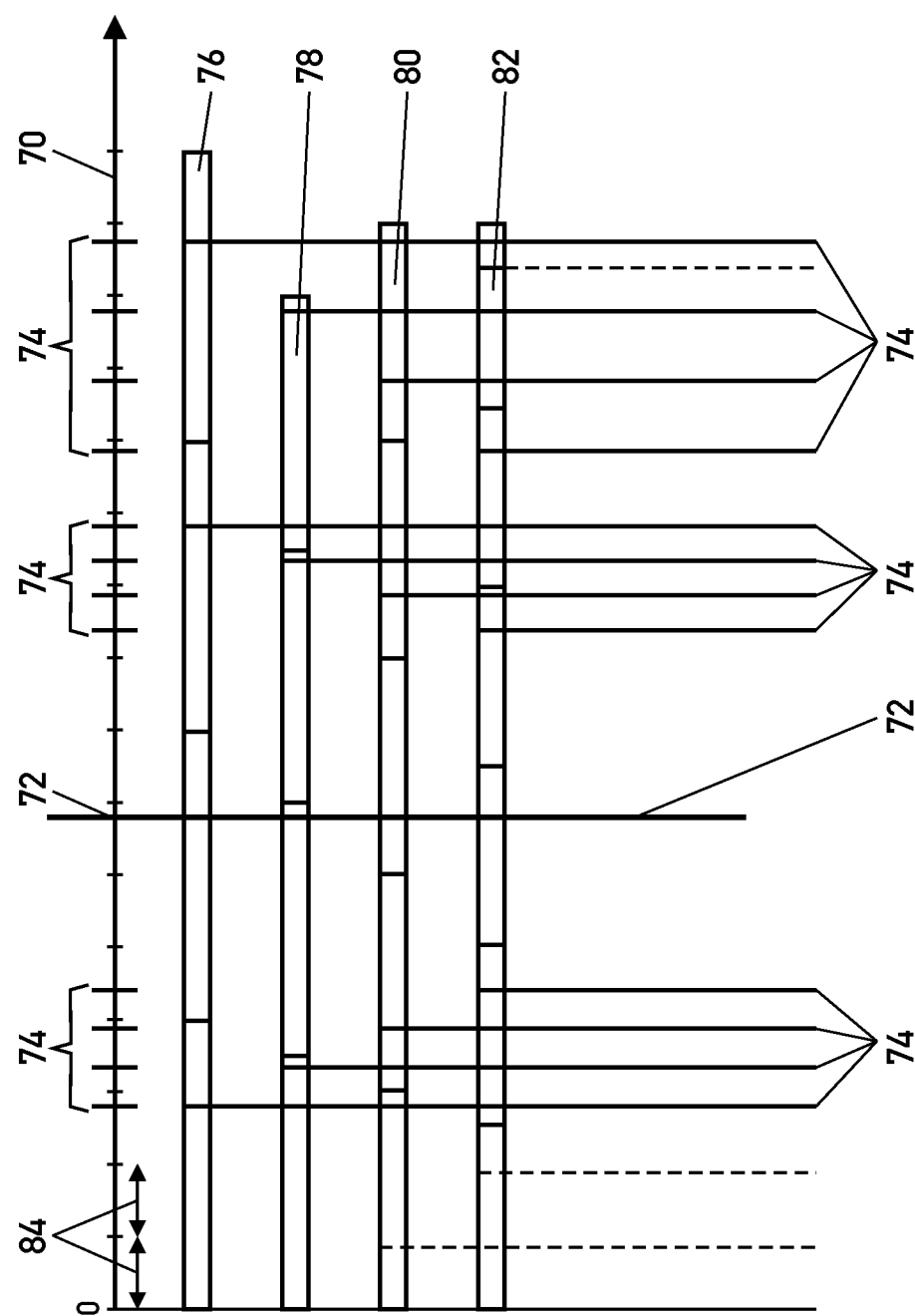

Further advantageous embodiments result from the dependent claims and from the exemplary embodiments explained with the aid of the attached drawing. These show:

FIG. 1 a schematic illustration of a watercraft with the underwater area to be scanned;

FIG. 2A-B a schematic illustration of the transmitting and receiving arrangement;

FIG. 3 a schematic illustration of the receiving arrangement;

FIG. 4 a block circuit diagram of the method according to the invention;

FIG. 5 a schematic illustration of a sound wavefront incident on the transducers;

FIG. 6 a schematic illustration of ambiguous path differences.

FIG. 1 shows a schematic illustration of a watercraft 2 travelling in an area of sea with a transmitting and receiving arrangement 4. By means of a lateral emission of directed sound signals, measurement data of a profile of the ground 6 are collected. The method according to the invention is not however limited to a lateral emission of sound, e.g. by using a so-called side-scan sonar system. The transmitting and receiving arrangement 4 can also be implemented according to a so-called forward-looking sonar system, and irradiate an underwater area in front of the craft.

In FIG. 1 a measurement geometry according to an exemplary embodiment is illustrated. The distance r from a ground point (x, y, z) to the transmitting and receiving arrangement 4 can be determined from the measured signal transit time $\tau$. A sound pulse takes a certain time to reach the ground, to be reflected and after a further transit time to arrive at the receiving arrangement. Based on the measurable total transit time $\tau$, by means of a known sound velocity the distance r from the ground point (x, y, z) can be determined.

In addition, a height H in the vertical direction to the transmitting and receiving arrangement 4 is indicated via a reference level.

To measure the profile of the ground 6, pulsed sound signals are emitted by the transmitting and receiving arrangement 4 into an underwater area 8 in a directed manner and the reflected sound waves 10 of individual ground points (x, y, z) are received. The transmitting and receiving arrangement 4 has a very broad directivity characteristic perpendicular to the direction of travel and a sharply focussed sound emission in the longitudinal direction of the craft. This means that only the echoes of a narrow strip of ground are received.

Figure 2:
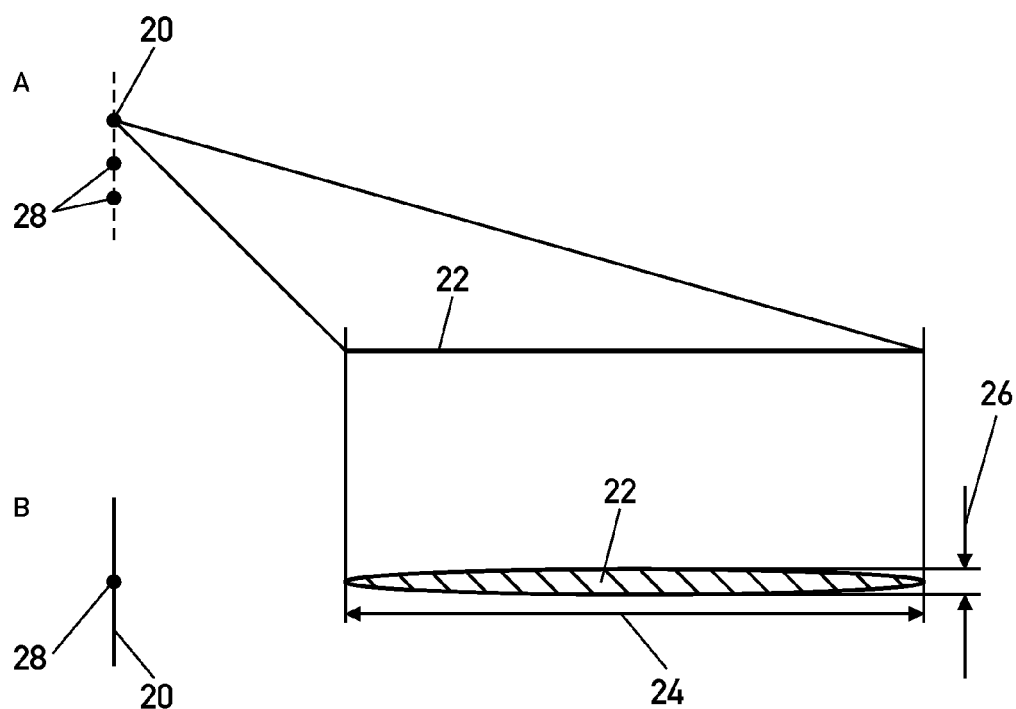

The extent of the irradiated underwater area 8 depends on the transmitting and receiving arrangement 4, which is shown in detail in FIG. 2.

FIG. 2A-B show a schematic illustration of the transmitting and receiving arrangement 4. In FIG. 2A a side view is shown and in FIG. 2B a plan view of the same arrangement.

The transmitting arrangement 20 has a plurality of transducers arranged on an antenna support, which emit sound signals in the form of a transmitter beam 22 into a predefined underwater area 8. The resulting transmitter beam 22 in the form of an ellipse has a length 24 and a width 26, wherein the shape and the dimensions are dependent on the number and the arrangement of the transducers of the transmitting arrangement 20.

By this transmitting arrangement 20 a sound signal is successively emitted into the underwater area 8 at brief intervals with a plurality N of predefined frequencies that are different from one another. The components of the sound signal reflected by the profile of the ground 6 within the underwater area 8 are received via the receiving arrangement 28, which is shown in detail in FIG. 3.

FIG. 3 shows a schematic illustration of the receiving arrangement 28.

In order to also determine, in addition to the distance r a height h of the profile of the ground 6, a receiving arrangement 28 is required with at least two transducers spaced apart from each other. In this exemplary embodiment of the invention the receiving arrangement 28 consists of two separate transducers A and B, as are shown in FIG. 3. They are spaced a distance 30 apart, which is greater than half the wavelength $\lambda$ of the sound signal emitted by the transmitting arrangement 20.

It is however equally possible to use an existing set of transducers, from which two transducers are selected. The method according to the invention can also be carried out with two transducer arrays which are arranged one above the other as in FIG. 2. If the nature of the construction of the watercraft 2 requires it, then the transducers can also be arranged slightly offset. The geometry of the receiving arrangement 28 is taken into account accordingly in the signal processing of the received signals. For this purpose the received signals are processed by means of known signal processing methods in such a manner as to simulate a spatial arrangement of the transducers according to the exemplary embodiment.

The transducer A delivers a received signal which is time-delayed by the different distances $r_A$ and $r_B$ to the ground point $x_0$ relative to the transducer B. The components of the emitted sound signal reflected from point $x_0$ first reach the transducer B and reach the transducer A delayed by $\Delta\tau$. This means that a height h can be determined which is related to a height H of the reference level in the vertical direction under the receiving arrangement 28.

The received signals from the transducers A and B are analysed according to the method according to the invention. They have a phase difference $\Delta\phi$ proportional to the path difference $\Delta r$.

FIG. 4 shows a block circuit diagram of the method according to the invention.

The electrical received signals 40 and 42 from the transducers A and B are each sampled in a processing block 44 or 46 at predefined sampling times and digitised. In addition, the N frequencies of the transmitted signal that differ from one another are filtered out of the received signals 40 and 42.

The processing blocks 44 or 46 therefore each deliver N signals: $48_1, 48_2, \ldots, 48_N$ or $50_1, 50_2, 50_3, \ldots, 50_N$, which are further processed in parallel for the N different frequencies. In the calculation unit $52_1$, for a plurality of the sampling times both the phase difference $\Delta\phi$ between the signals $48_1$ and $50_1$ and the transit times $\tau$ of these signals are determined. This also takes place in the calculation unit $52_2$ for the signals $48_2$ and $50_2$, and in the calculation unit $52_3$ for the signals $48_3$ and $50_3$, up to the calculation unit $52_N$ for the signals $48_N$ and $50_N$. By this means, for a plurality of the sampling times and for the N frequencies the phase differences $\Delta\phi$ and the transit times $\tau$ of the signals received from the transducers A and B are determined. Depending on the distance 30 of the two transducers however, multiple ambiguities in the determined phase differences $\Delta\phi$ are possible. This is shown in detail in FIG. 5.

FIG. 5 shows a schematic illustration of a sound wavefront 64 incident on the transducers A and B. If the distance 30 between the two transducers A and B is greater than half the wavelength $\lambda$ of the received sound wavefront 64, then multiple ambiguities occur in the determined phase differences $\Delta\phi$. The phase difference $\Delta\phi$ of the received signals determined between the transducers A and B is measured modulo $2\pi$ and thus delivers a number of ambiguous path differences $\Delta x1, \Delta x2, \Delta x3$ depending on the distance 30 between the transducers A and B as shown in FIG. 5 using an example.

The path difference $\Delta x3$ corresponds in this exemplary embodiment to the true path difference of the received signals between the transducers A and B. This path difference $\Delta x3$ in connection with the distance 30 between the transducers delivers an associated receiving angle 66 according to the definition of the sine of an angle based on the right-angled triangle. Since the path differences and hence also the receiving angle 66 are dependent on the wavelength $\lambda$ of the received sound wavefront 64, at each of the N frequencies of the transmitted signal different path differences or receiving angles 66 are determined.

The block circuit diagram of FIG. 4 shows the calculation unit 54 in which, in a following method step, $54_1 \ldots 54_N$ the ambiguous path differences are determined block-wise at a plurality of the sampling times and for the N frequencies by means of the previously determined phase differences $\Delta\phi$. These are passed to a further calculation unit 56 for the sampling times and for the N frequencies, which determines a data density of the path differences from them. The data density thus represents a measure of the number of data points collected and is explained in further detail with the aid of FIG. 6.

FIG. 6 shows a schematic illustration of the ambiguous path differences using an example of four different wavelengths or four different frequencies.

A horizontal axis 70 is used to indicate the path difference. The true path difference is located at a point 72 on this axis 70. The true path difference is that path difference which belongs to that unambiguous phase difference $\Delta\phi$ of the received signals which describes the actual path difference $\Delta r$ between the sound signals of the two transducers A and B. At this point 72, the individual path differences of the four frequencies coincide. The markings 74 indicate the ambiguous path differences which result from the variable phase differences $\Delta\phi$ of the different frequencies or wavelengths 76, 78, 80 and 82. At these points 74, the individual path differences of the four frequencies are somewhat offset. In order to obtain unambiguous results when measuring the profile of the ground, it is necessary to determine the unique phase difference $\Delta\phi$ or the true path difference of the received signals.

For this purpose the axis 70 is divided into a plurality of equal-sized intervals 84 with a predefined, sufficiently short length. The length of these intervals 84 depends on the extent to which the individual path differences are minimally offset. The length of the intervals 84 must not be greater than the smallest offset of the path differences of the smallest wavelength relative to the largest wavelength. For each interval 84 a data density of the path differences is calculated. It is a measure of the number of path differences within this interval. The interval 84 in which the true path difference is located contains a maximum data density, since this interval 84 includes the path differences of all four frequencies.

The additional calculation unit 56 of FIG. 4 additionally contains a maximum detector, in order to determine the maximum data density for the sampling times. At each sampling time at which a path difference was determined, that path difference, the associated interval 84 of which has the greatest data density is marked as valid for the continuation of the method.

The other ambiguous path differences associated with this sampling time are marked as invalid.

By means of the valid path difference, an associated signal transit time $\tau$ of the corresponding received signal, and an associated receiving angle 66 can be determined for the sampling times in a processing block 58 according to FIG. 5. From these data, an angle of incidence associated with the valid path difference on the profile of the ground can be determined for the sampling times. This is effected by means of known laws of trigonometry used in measurement geometry.

From the previously determined angles of incidence, in a processing block 60 an associated incidence coordinate (x, y, z) of the profile of the ground 6 is determined for the sampling times. The x-coordinate can be determined at each sampling time using the laws of trigonometry, the y-coordinate depends on the width 26 of the transmitted beam 22 and the z-coordinate corresponds to a height h determined from the previously determined true path difference of the received signals from the transducers A and B.

The coordinate system in this exemplary embodiment is fixed relative to the watercraft 2. It is however also possible to use an absolute coordinate system for carrying out the method, if it is appropriately taken into account in the signal processing stage.

The above described method for measuring a profile of the ground 6 can be varied to the effect that the data density is not collected from data on the path differences, but from a quantity that is derived from the path difference. This can be, e.g., an angle of incidence or an incidence coordinate.

For this purpose, for the sampling times at which a phase difference $\Delta\phi$ of the received signals was determined, and for the N frequencies, the angles of incidence associated with the ambiguous path differences are first determined, and then the incidence coordinates. This provides ambiguous profiles of the ground for each of the N frequencies. The preceding steps of the above described method remain unchanged.

These data on the ambiguous profiles of the ground for the N frequencies are collected for the sampling times, in order to ascertain the unambiguous profile of the ground 6 by means of a density analysis. In this case however it is not, as previously described, individual intervals 84 that are considered, but individual so-called surface elements. For the sampling times, for the N frequencies and for each ambiguous incidence coordinate, the data density within that surface element is calculated which contains the incidence coordinate. The data density is thus a measure of the number of data points collected within the surface element. The incidence coordinates of the same frequency however are not jointly taken into account in determining the density.

The size of the surface element is specified in accordance with the computational cost and is equal in size for all incidence coordinates.

At each sampling time the particular incidence coordinate, the associated surface element of which has a maximal data density, is marked as valid and therefore corresponds to the true ground point (x, y, z). The other ambiguous incidence coordinates are marked as invalid.

A density analysis of this kind, such as described above, can also be performed by using the angle of incidence.

The above described method can be varied to the effect that, instead of two separate transducers being used, a transducer array is used as the receiving arrangement 28. A beamformer is connected downstream of the receiving arrangement 28 that generates a plurality of directivity characteristics which extend in a fan-like manner in the underwater area 8, the horizontal width of which is defined by the horizontal beam width of the directivity characteristic. This enables a higher resolution of the measurement of the profile of the ground 6 in accordance with the width of the directivity characteristics.

In a variation of the described method, the underwater area 8 can be extended over both the starboard and port sides of the watercraft 2. This means that underwater areas 8 on both sides in the direction of travel can be scanned at the same time. In addition, an underwater area 8 in the direction of the craft's heading can be irradiated.

All features cited in the above description of the figures, in the claims and in the introduction to the description can be used both separately and also in any desired combination with one another. The invention is therefore not limited to the described or claimed feature combinations. Rather, all feature combinations are to be regarded as disclosed.

The invention claimed is:

1. A method for measuring a profile of the ground (6) by means of a transmitting arrangement (20) attached to a watercraft (2) for the targeted emission of sound signals into an underwater area (8) and by means of a receiving arrangement (28) attached to said watercraft (2) having at least two transducers for receiving the sound waves reflected by the profile of the ground (6) inside the underwater area (8), from which the transducers each generate a received signal (40; 42), which is sampled, digitised and stored at predefined sampling times and wherein a sound signal with a plurality N of predefined frequencies that are different from one another is successively emitted into the underwater area (8) by means of said transmitting arrangement (20) and components of said sound signal reflected by the profile of the ground (6) are received by means of the receiving arrangement (28) and the N different frequencies are filtered out of the received signal (40; 42), and wherein for a plurality of the sampling times and for the N frequencies of the received signals ($48_1$, $48_2$, $48_3$, ..., $48_N$; $50_1$, $50_2$, $50_3$, ..., $50_N$), both a phase difference ($\Delta\phi$) and a transit time ($\tau$) of these received signals are determined, wherein
the electroacoustic and/or optoacoustic transducers of the receiving arrangement (28) are arranged at a distance (30) greater than half the wavelength ($\lambda$) of the received signal (40; 42), via the phase differences ($\Delta\phi$), determining path differences of the received sound waves resulting therefrom between two transducers of the receiving arrangement (28) and associated receiving angles (66), determining incidence coordinates (x, y, z) for these sampling times and for the N frequencies, by means of the transit times ($\tau$) and the receiving angles (66), determining a data density for the incidence coordinates (x, y, z) within a predefined surface element containing the incidence coordinate (x, y, z), wherein the data density represents a measure of the number of previously determined incidence coordinates (x, y, z) within this surface element, and selecting the particular surface element in which the data density becomes maximal and the incidence coordinate (x, y, z) belonging to this surface element is determined as the true incidence coordinate (x, y, z) of the profile of the ground (6).

2. The method according to claim 1,
wherein said method includes calculating the angles of incidence from the respective path differences, and determining for the plurality of the sampling times and for the N frequencies a data density of the angles of incidence of the reflected sound waves at the profile of the ground (6) in each predefined region (84).

3. The method according to claim 1, wherein the receiving arrangement (28) consists of a plurality of electroacoustic and/or optoacoustic transducers, by means of which the sound waves are received in a direction-selective manner.

4. A device for measuring a profile of the ground (6) by means of a transmitting arrangement (20) attached to a watercraft (2) for the targeted emission of sound signals into an underwater area (8) and by means of a receiving arrangement (28) attached to said watercraft (2), having at least two transducers for receiving the sound waves reflected by the profile of the ground (6) inside the underwater area (8), from which the transducers each generate a received signal (40; 42), which can be sampled, digitised and stored at predefined sampling times and wherein a sound signal with a plurality N of predefined frequencies that are different from one another can be successively emitted into the underwater area (8) by means of said transmitting arrangement (20) and components of said sound signal reflected by the profile of the ground (6) can be received by means of said receiving arrangement (28) and the N different frequencies can be filtered out of the received signal (40; 42), and wherein for a plurality of the sampling times and for the N frequencies of the received signals ($48_1$, $48_2$, $48_3$, ..., $48_N$; $50_1$, $50_2$, $50_3$, ..., $50_N$) both a phase difference ($\Delta\phi$) and a transit time ($\tau$) of these received signals can be determined, wherein an arrangement of the electroacoustic and/or optoacoustic transducers of the receiving arrangement (28) at a distance (30) greater than half the wavelength ($\lambda$) of the received signal (40; 42), a further calculation unit (54) for determining the path differences of the received sound waves between two transducers of the receiving arrangement (28), said path differences resulting from the phase differences ($\Delta\phi$), a further calculation unit (58) for determining a receiving angle (66) associated with the path difference, a further calculation unit (60) for determining of incidence coordinates (x, y, z) by means of the transit times ($\tau$) and the receiving angles (66) for these sampling times and for the N frequencies, a further calculation unit (56) for determining a data density within a predefined surface element containing the incidence coordinate, wherein the data density represents a measure of the number of previously determined incidence coordinates (x, y, z) inside this surface element, a maximum detector (56) for selecting the particular surface element in which the data density is maximal and for determining an incidence coordinate (x, y, z) of the profile of the ground (6) belonging to this surface element.

5. The device according to claim 4,
wherein a further calculation unit (56) for determining a data density of the angle of incidence of the reflected sound waves on the profile of the ground (6) for these sampling times and for the N frequencies in each case in a predefined region (84).

6. The device according to claim 4,
wherein the receiving arrangement (28) consists of a plurality of electroacoustic and/or optoacoustic transducers by means of which the sound waves can be received in a direction-selective manner.

* * * * *